United States Patent
Frantz et al.

(10) Patent No.: US 9,182,810 B2
(45) Date of Patent: *Nov. 10, 2015

(54) DOMAIN SPECIFIC LANGUAGE, COMPILER AND JIT FOR DYNAMIC POWER MANAGEMENT

(71) Applicant: QUALCOMM Incorporated, San Diego, CA (US)

(72) Inventors: Andrew J. Frantz, Superior, CO (US); Norman S. Gargash, Raleigh, NC (US); Tracy A. Ulmer, Westminster, CO (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/894,914

(22) Filed: May 15, 2013

(65) Prior Publication Data

US 2013/0262899 A1    Oct. 3, 2013

Related U.S. Application Data

(63) Continuation of application No. 12/965,028, filed on Dec. 10, 2010, now Pat. No. 8,504,855.

(60) Provisional application No. 61/294,055, filed on Jan. 11, 2010, provisional application No. 61/416,469, filed on Nov. 23, 2010.

(51) Int. Cl.
G06F 1/32     (2006.01)
G06F 9/45     (2006.01)

(52) U.S. Cl.
CPC ............ *G06F 1/3287* (2013.01); *G06F 1/3203* (2013.01); *G06F 1/3296* (2013.01);
(Continued)

(58) Field of Classification Search
CPC ....... G06F 1/32; G06F 1/3287; G06F 1/3203; G06F 1/3296; G06F 8/41; G06F 8/4432; Y02B 60/181; Y02B 60/1278; Y02B 60/1282; Y02B 60/1285
See application file for complete search history.

(56) References Cited

U.S. PATENT DOCUMENTS

| 6,457,135 B1 | 9/2002 | Cooper |
| RE38,108 E | 5/2003 | Chee et al. |

(Continued)

FOREIGN PATENT DOCUMENTS

| CN | 1658127 A | 8/2005 |
| CN | 101120298 A | 2/2008 |

(Continued)

OTHER PUBLICATIONS

Eui-Young Chung et al: "Dynamic power management using adaptive learning tree", 1999 IEEE/ACM International Conference on Computer-Aided Design. Digest of Technical Papers (CAT. No. 99CH37051) IEEE Piscataway, NJ, USA, 1999, pp. 274-279, XP002633691, ISBN: 0-7803-5832-.

(Continued)

*Primary Examiner* — Fahmida Rahman
(74) *Attorney, Agent, or Firm* — Nicholas A. Cole

(57) ABSTRACT

The aspects enable a computing device or microprocessor to determine a low-power mode that maximizes system power savings by placing selected resources in a low power mode while continuing to function reliably, depending upon the resources not in use, acceptable system latencies, dynamic operating conditions (e.g., temperature), expected idle time, and the unique electrical characteristics of the particular device. The various aspects provide mechanisms and methods for compiling a plurality of low power resource modes to generate one or more synthetic low power resources from which can be selected an optimal low-power mode configuration made up of a set of selected synthetic low power resources.

44 Claims, 7 Drawing Sheets

(52) U.S. Cl.
CPC .............. *G06F 8/41* (2013.01); *G06F 8/4432* (2013.01); *Y02B 60/1282* (2013.01); *Y02B 60/1285* (2013.01); *Y02B 60/181* (2013.01)

(56) References Cited

U.S. PATENT DOCUMENTS

| | | |
|---|---|---|
| 7,246,181 B2 | 7/2007 | Rosing |
| 7,360,106 B2 | 4/2008 | Kato et al. |
| 7,366,921 B2 | 4/2008 | Ranganathan |
| 7,386,747 B2 | 6/2008 | Dockser et al. |
| 7,454,631 B1 | 11/2008 | Laudon et al. |
| 7,529,956 B2 | 5/2009 | Stufflebeam |
| 7,539,885 B2 | 5/2009 | Ma |
| 7,647,078 B2 | 1/2010 | Kim et al. |
| 7,716,506 B1 | 5/2010 | Surgutchik et al. |
| 7,752,468 B2 | 7/2010 | Dodeja et al. |
| 7,783,905 B2 | 8/2010 | Chang et al. |
| 8,332,675 B2 | 12/2012 | Kwa et al. |
| 8,341,628 B2 | 12/2012 | Arndt et al. |
| 2003/0028711 A1 | 2/2003 | Woo et al. |
| 2004/0002823 A1 | 1/2004 | Aldridge et al. |
| 2004/0123172 A1 | 6/2004 | Sheller |
| 2004/0128567 A1 | 7/2004 | Stewart et al. |
| 2005/0071698 A1 | 3/2005 | Kangas |
| 2005/0181840 A1 | 8/2005 | Banginwar et al. |
| 2005/0210312 A1 | 9/2005 | Maruichi et al. |
| 2006/0282826 A1 | 12/2006 | Dockser |
| 2008/0028240 A1 | 1/2008 | Arai et al. |
| 2009/0172434 A1 | 7/2009 | Kwa et al. |
| 2009/0249103 A1 | 10/2009 | Jeyaseelan et al. |
| 2009/0299543 A1 | 12/2009 | Cox et al. |
| 2009/0327784 A1 | 12/2009 | Shah et al. |
| 2010/0019837 A1 | 1/2010 | Rozen et al. |
| 2010/0162256 A1 | 6/2010 | Branover et al. |
| 2010/0169680 A1 | 7/2010 | Struik |
| 2010/0169684 A1* | 7/2010 | Jeyaseelan et al. ............ 713/323 |
| 2010/0169685 A1 | 7/2010 | Gough et al. |
| 2010/0287394 A1 | 11/2010 | Branover et al. |
| 2011/0173474 A1 | 7/2011 | Salsbery et al. |
| 2011/0173475 A1 | 7/2011 | Frantz et al. |
| 2012/0324265 A1 | 12/2012 | Jeyaseelan et al. |
| 2013/0007492 A1 | 1/2013 | Sokol, Jr. et al. |
| 2013/0073884 A1 | 3/2013 | Ulmer et al. |
| 2013/0111242 A1 | 5/2013 | Heller et al. |
| 2013/0290758 A1 | 10/2013 | Quick et al. |

FOREIGN PATENT DOCUMENTS

| | | |
|---|---|---|
| GB | 2421325 A | 6/2006 |
| JP | H10268987 A | 10/1998 |
| JP | 2002244761 A | 8/2002 |
| JP | 2002258997 A | 9/2002 |
| JP | 2004192256 A | 7/2004 |
| JP | 2005234826 A | 9/2005 |
| JP | 2006163643 A | 6/2006 |
| JP | 2006254185 A | 9/2006 |
| JP | 2007042090 A | 2/2007 |
| JP | 2008507762 A | 3/2008 |
| JP | 2008141290 A | 6/2008 |
| JP | 2010009581 A | 1/2010 |
| WO | 2006088167 A2 | 8/2006 |
| WO | 2006138687 A2 | 12/2006 |

OTHER PUBLICATIONS

International Search Report and Written Opinion—PCT/US2011/020714, ISA/EPO—Apr. 29, 2011.

Krogh B H et al., "Hierarchical Adaptive Dynamic Power Management", IEEE Transactions on Computers, IEEE Service Center, Los Alamitos, CA, US, vol. 54, No. 4, Apr. 1, 2005, pp. 409-420, XP011127489, ISSN: 0018-9340, DOI:10.1109/TC.2005.66.

Li F., et al., "Compiler Directed Proactive Power Management for Networks", Cases 2005: International Conference on Compilers, Architecture, and Synthesis for Embedded Systems; Sep. 24-27, 2005, San Francisco, California, USA, ACM Press, New York, NY, Sep. 24, 2005, pp. 137-146, XP007907412, ISBN: 978-1-59593-149-8 figures 1-4, 6 table 1 abstract 1. Introduction and motivation; p. 137-p. 138 3. Architecture and power model; p. 139-p. 140 4.3. Example; p. 142, 4.4. Discussion; p. 142-p. 143.

Huiling W., et al., "Circuit Fundamentals," Higher Education Press, pp. 1-7.

\* cited by examiner

DOMAIN SPECIFIC LANGUAGE, COMPILER AND JIT FOR DYNAMIC POWER MANAGEMENT

RELATED APPLICATIONS

This application is a continuation of U.S. patent application Ser. No. 12/965,028 filed Dec. 10, 2010, issued as U.S. Pat. No. 8,504,855, entitled "Domain Specific Language, Compiler and JIT for Dynamic Power Management," which claims the benefit of priority to U.S. Provisional Patent Application No. 61/294,055 filed Jan. 11, 2010 entitled "Dynamic Low Power Mode Implementation For Computing Devices," and U.S. Provisional Patent Application No. 61/416,469 filed Nov. 23, 2010 entitled "Domain Specific Language, Compiler and JIT for Dynamic Power Management," the entire contents of all of which are hereby incorporated by reference.

FIELD

The present invention relates to methods for managing power in computing devices, and more particularly to methods for efficiently determining a suitable low power mode for implementation by a mobile device processor.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. Battery life is a key driver of mobile electronic devices so methods and devices which enable conservation of battery power are important considerations in electronic device technologies.

SUMMARY

The various aspects provide a domain specific language, compiler and Just-In-Time (JIT) compiler for use in dynamic power management of mobile computing devices. The various aspects provide data and methods used by a processor within a computing device to select optimal, or near optimum, low-power operating modes for resources used by the computing device. The methods include using a compiler to compile resource descriptions written in a compilable language to yield a number of real or virtual low power modes. The various aspects allow components to define one or more low power modes, which may include virtual low power modes, and the processor to select one or more optimal low power modes from the different resources. The various aspects may use a domain specific compiler to detect dominance relationships within a set of component low power modes and to combine individual low power resources into a single new synthetic low power resource. The various aspects provide a compiler that combines a number of resources into a single synthetic resource at registration time, thereby reducing the amount of function calling and manipulation required to extract the optimal low power modes for the different resources. The various aspects provide methods, systems and devices for reducing the number of low power modes that have to be compared to determine the optimal low power state. The various aspects can be implemented in a variety of systems and for numerous power savings applications, including systems and applications that do not implement sleep modes.

Various aspects include methods for conserving power in a computing device having a plurality of resources and at least one processor, including defining a plurality of low power resource modes in a compilable expression, the low power resource modes identifying a set of resource dependencies, power savings and latency time characteristics associated with a resource as well as a low power state into which each of the plurality of resources can be placed when not in use, compiling the defined plurality of low power resource modes to generate one or more synthetic low power resources each having one or more synthetic low power resource modes that represent functionality, power savings, latency and resource dependencies characteristics of one or more of the low power resource modes, selecting at most one synthetic low power resource mode for each synthetic low power resource based on the mode's power savings, latency time, and dependency requirements, and entering and exiting the selected synthetic low power resource modes in the appropriate order when the system becomes and leaves idle. In aspect methods, each of the synthetic low power resource modes may have an enter function and an exit function, the enter function may have the same functionality as the enter functions of two or more low power resource modes, and the exit function may the same functionality as the exit functions of two or more low power resource modes. In aspect methods, just-in-time compilation techniques may be used to dynamically rewrite code associated with functions of two or more low power resource modes to generate a single synthetic function that has the same functionality as the functions of the two or more low power resource modes. The aspect methods may further include determining a latency budget based upon latency requirements identified by processors and clients, and low power resource modes may be selected based on their having a latency requirement that is less than the latency budget. In aspect methods, the low power resource modes may be selected considering operating temperature. In aspect methods, all of the synthetic low power resource modes within a synthetic low power resource may be generated to be mutually exclusive. In aspect methods, each synthetic low power resource mode may define an ordering mechanism that identifies an order of operations in which the processor must select, enter and exit the synthetic low power resource mode. In aspect methods, the synthetic low power resources may be generated by a domain specific compiler that respects dependency relationships between the low power resource modes. Some aspect methods may further include evaluating the low power resource modes of each resource to select one low power resource mode for each resource that may be placed in a low power state based upon the resource dependencies, power savings, expected idle time and latency time characteristics. In aspect methods, the operations of compiling the defined plurality of low power resource modes to generate one or more synthetic low power resources may include defining for each one or more synthetic low power resource modes an associated backoff time indicating an amount of time to be allowed for the synthetic low power resource mode to exit before a next scheduled wakeup event occurs.

Various aspects include a computing device having a plurality of resources and at least one processor that includes means for implementing functions of the aspect methods described in the preceding paragraph.

Various aspects include an apparatus for conserving power in a computing device having a plurality of resources in which the apparatus includes a memory buffer, and a processor coupled to the memory buffer, in which the processor is configured with software instructions to perform operations of the aspect methods described above.

Various aspects include a non-transitory storage medium having stored thereon processor-executable instructions configured to cause a processor to perform operations of the aspect methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
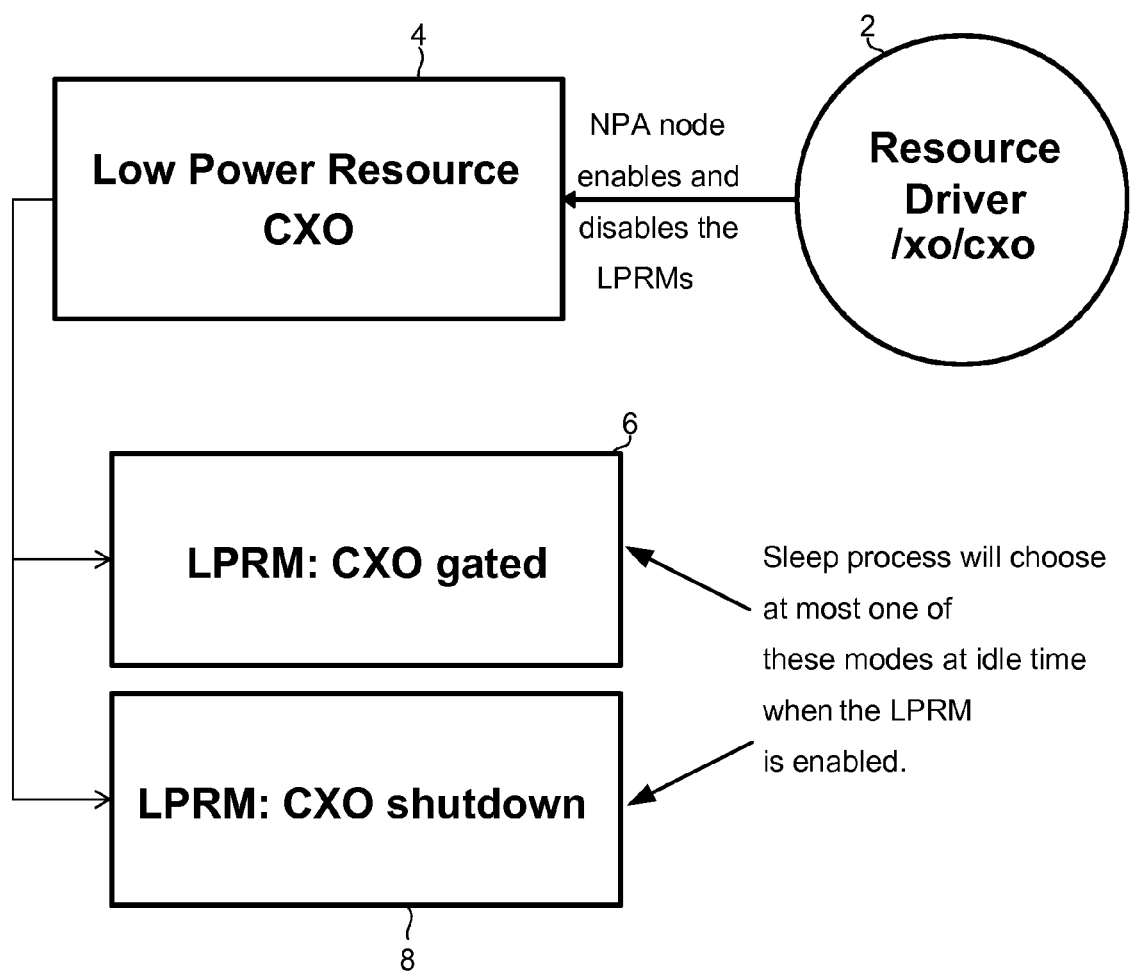
FIG. 1 is a diagram of a resource controlled by a programming node to enter one of two low power modes.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "electronic device," "mobile device" and "computing device" are used interchangeably herein to refer to any one or all of cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

The term "resource" is used herein to refer to any of a wide variety of circuits (e.g., ports, clocks, buses, oscillators, etc.), components (e.g., memory), tasks (software processes executed by a processor), signals (e.g., clock signals), and voltages (e.g., voltage rails) which are used to support processors, components and clients running on a computing device.

Maximizing the battery life of wireless devices is an extremely important design criterion Improved battery life maximizes the user's experience by allowing users to do more within wireless device for longer periods of time. However, in order to truly maximize the user's experience, power saving strategies must be implemented so as they do not alter the device's functionality or reliability. As such, designing efficient and effective power saving schemes that do not alter functionality is an important goal for mobile and wireless device providers.

To maximize battery life, most mobile broadcast receivers are configured to place the one or more processors and device resources in a low power state whenever possible, such as when a processor is in an idle state. Placing device resources in a low power state typically consists of turning off the various device resources whenever the processor is not actively processing tasks, and/or is in an idle state. Resources that are able to be turned on and off, or placed in an idle state, when the processor is not processing tasks and/or is in an idle state are referred to herein as low power resources, or LPRs. In multiprocessor devices, such as smart phones which may have a wireless modem processor and an application processor, the operations of implementing low power modes may be implemented by each processor independently or in a coordinated manner.

A mobile computing device typically includes a number of resources that the device processor uses, such as a crystal oscillator, voltage rails, one or more memory units, communication busses, etc. With computing devices becoming ever more complex, the number of resources used or managed by device processors is increasing every year. For example, many mobile computing devices now include multiple crystal oscillators, multiple voltage rails, and multiple memories, each of which can be controlled independently. Consequently, there are many different resources that a computing device processor may turn off or place in a low power mode in order to conserve power. Also, computing devices may have multiple processors using the various device resources and performing different tasks (and thus may not be idle at the same time). For these reasons, a degree of executive control must be exercised when selecting resources to be placed in a low power mode. Choosing the resources to place in low power modes is known as the "sleep problem."

Generally, processors may turn off or disable low power resources when the processor no longer needs a resource, such as when the processor enters a stable idle state. When the processor "wakes up" (e.g., leaves the idle state to perform another process), disabled resources may then be turned on and/or re-enabled. Each low power resource may have a different power consumption levels and latency characteristics (i.e., the time required to return the resource to a full power mode). That is, each resource may consume a different amount of power in their high power mode, may require a different amount of time to enter and leave the power off and/or idle state, and may consume a different amount of power when entering and leaving such states. If the power required to turn a resource on and off is greater than the power saved by having the resource in a low power mode for the estimated duration of an idle state, then the battery life of the wireless device may not be maximized by simply turning the resource off and/or placing it in an idle state whenever the processor is idle and in a well defined state. Also, resources may have more than one low power mode, which are referred to herein as low power resource modes (LPRMs). Thus, the sleep problem of determining which low power resources should be turned off and/or placed in low power mode, as well as the particular low power mode that a resource should be placed in typically requires analysis of the processor state as well as states of other device processors, along with each resource's low power mode characteristics, such as latency, power saving potential, power consumption and interdependencies.

Each low power resource mode of each resource may be characterized in terms of its latency, power savings potential, transition power consumption, low power mode entrance criteria, mode exit criteria and resource interdependencies. Each low power resource mode for a particular resource may have different power savings characteristics and latency times. For example, one low power mode for a resource may completely disable the resource (e.g., deenergizing the power), while a second low power mode may involve reduced functionality or periodic operation of the resource. Each low power resource mode may have different operating characteristics, such as providing different power savings per unit time and requiring different amounts of time to enter and leave the mode (i.e., different latency requirements). For example, a volatile memory chip may have two low power modes; a deep power-down mode which consumes the least amount of power but requires greater time (i.e., greater latency) to return to an operating state, and a self-refresh mode which continues to consume some battery power but has lower latency (i.e., it can return to the full functioning state very quickly). Further, the power savings afforded by each low power resource mode may depend upon operating conditions, such as temperature and expected idle time. Thus, in some aspects, the low power modes may compute the expected power savings as the product of potential power savings per unit time at a current temperature, multiplied by the determined expected idle time. In other aspects, the expected power savings may be determined as another function of temperature, expected idle time and other variables.

As mentioned above, placing a resource in a low-power mode and restoring it to a normal mode upon wakeup of the processor often requires some work, which takes both power and time (i.e., latency) to accomplish. The extra power and time necessary to enter a low-power mode may not result in actual power savings if the amount of time that the system remains in an idle state is too short. In other words, the power consumed in placing the resource into a low-power mode and returning it to full operation may be greater than the power saved during the short time it was in the low-power mode. Thus, the benefit of entering a particular low-power mode will depend upon the expected time that the processor may remain idle. This time is referred to herein as the "expected idle time."

The amount of power that may be saved by placing a resource in a low-power mode will vary based on the characteristics of the operating mode and of any required resources, as well as the amount of time that the resource will remain in the low-power mode. For example, placing a memory chip in a self-refresh low-power mode may consume power associated with the self-refresh processes as well as require the availability of power to the chip. Thus, the power savings available in a particular low-power mode is an important characteristic to consider in selecting among a plurality of low power resource modes.

As mentioned above, the amount of power that may be saved by placing a resource in a particular low-power mode may depend upon environmental and operational factors, such as temperature. Temperature affects electrical properties such as current leakage, resistance and power consumption within the device. Thus, the power savings associated with the different low power resource modes at room temperature (as must be assumed when low-power mode configurations are developed in advance) may be quite different in the field when the device is much colder (e.g., during the winter in Alaska) or warmer (e.g., during the summer in Texas). Consequently, the power savings of different low power mode configurations (i.e., selected low power resource modes) in real-life conditions may mean the real optimum low-power mode is different from what can be anticipated in advance. Since the temperature of a device cannot be known in advance, this important characteristic cannot be used for selecting low-power mode configurations using conventional methods for organizing and selecting low-power modes.

While saving power is an important goal in configuring low-power modes for electronic devices, consideration also has to be given to ensuring the device continues to operate properly after entering a low-power mode. Thus, consideration of the latencies associated with each low power resource mode is also important. As mentioned above, a certain amount of time is required to enter and exit a low power resource mode and return to the resource to a normal operating mode. This latency time should be less than the expected idle time or the low-power mode will be of little benefit. More significantly, the latency associated with entering and exiting the low power resource mode must be less than the maximum allowable system latency of any client or processor that may demand the resource when it is in low-power mode. If a particular low power resource mode could cause the system's acceptable latency to be exceeded, then the particular low-power mode may not be acceptable because it could lead to a function error or cause some unrelated technology to function incorrectly. An example of such a situation is when a universal serial bus (USB) connector is plugged into a mobile device. The USB protocol typically has a very short latency requirement, and if the host does not receive a response to a resource request within that latency the host may consider the device malfunctioning. Thus, any low power resource mode or combination of low power modes with a latency greater than the USB latency requirement should not enter a low-power mode when a current operating configuration includes connection to a USB device.

In addition to latency and operating conditions, a resource's low-power modes may also depend on other resources and/or conditions. Such resource interdependency considerations are referred to herein generally as "dependencies." These dependencies may be interdependent (i.e., the mode can only be enabled if another resource remains available), exclusive (i.e., the mode cannot be entered if a particular other resource is in a low power mode or not in a high power mode), or orthogonal (i.e., the modes have no relationship with one another and may be enabled independently). Low power mode dependencies may also be classified as being either "static" or "dynamic." Static dependencies (also referred to as enabled dependencies) are those that define conditions which must be met before a resource may even consider performing a particular low power mode operation. Dynamic dependencies (also referred to as entered dependencies), on the other hand, arise when one mode can only be performed in conjunction with another mode in the system, which is typically only determinable at runtime.

To illustrate static and dynamic dependencies, consider the example of a voltage regulator resource providing power to a clock driver resource and some other miscellaneous hardware resource. The voltage regulator may have two operating modes: normal and low power (i.e., its low power resource mode). Putting the voltage regulator into is low power mode may reduce the amount of energy overhead consumed by the voltage regulator, resulting in an overall lower system power demand. However, if more power is drawn from the voltage regulator than is allowed in its low power mode, the voltage regulator might fail and potentially damage the device hardware. For example, the clock driver may consume more power than the voltage regulator can provide in its low power mode. In this case, the voltage regulator may have one static dependency with respect to the clock driver (i.e., the clock must be able to be turned off), and another static dependency with respect to the other miscellaneous hardware (i.e., the miscellaneous hardware must be turned off). In addition, the voltage regulator may have a dynamic dependency: as long as the clock driver remains on, there will be too much power drawn from the voltage regulator for it to enter its low power mode. As soon as the clock driver turns off, then there will be no load on the voltage regulator and it will be able to enter its low power mode. Thus, the clock driver's power off mode is a dynamic dependency of the voltage regulator's low power mode.

While static dependencies may be anticipated with some degree of certainty, dynamic dependencies are hard to determine ahead of time. Further, dynamic dependencies become exponentially more complex as the number of components and/or resources increase. Effectively managing the dynamic dependencies of low power modes will become more and more important as modern wireless devices continue to grow in complexity and include more components.

Thus, configuring a device to conserve battery life by idling and/or disabling resources involves selecting from among the different low power resource modes in order to balance the various low-power mode characteristics of power savings, latencies and interdependencies of the various resources, as well as the requirements of clients, processors, and applications that may be running concurrently. This selection process is a computationally difficult task (akin to the classic "knapsack" problem) due to the number of variables and permutations that may be considered, especially as the complexity of computing devices increase.

Currently, low-power modes for processors and electronic devices are configured in advance by developers based on a static set of priorities. One or a few sets of low-power modes may be hard coded into a processor or system during development. The selection of one low power mode configuration from a set of low-power modes is currently controlled by hardcoded if-then/else decision tree programming. When multiple low-power modes are provided, the processor may select among the various modes by allowing the operating clients to indicate their various resource requirements or operating conditions by "voting." The result of client voting may be to explicitly disable one or more low-power modes.

Today's methods for developing and implementing low-power modes in computing devices cannot take into consideration a device's current operating conditions (e.g., temperature), latency requirements or dependencies. Further, current implementations of low-power modes are not tuned to particular device configurations and cannot explicitly address the latency requirements of particular clients, since the operating state of components cannot be predicted in advance. As such, the current method developing and implementing low-power modes typically requires configuring low-power modes in advance.

In previous generations of devices, configuring low-power modes in advance was reasonable because the number of different resources and clients that may interact with the processor was limited, such that a small number of different operating states could be anticipated. However, modern electronic devices are becoming ever more sophisticated, involving multiple processors, numerous resources and concurrent clients, such that it may no longer be possible to define optimum low-power modes that can be hard coded into processors. Further, the selection of a previously defined low power mode using if-then/else decision tree programming scales roughly according $2^n$ where "n" is the number of resources involved in the determination. As a result developers have to settle for a subset of low power mode configurations that can be hardcoded in advance, which may be sub-optimal in some if not all operational states. Requiring developers to adopt sub-optimal low power mode configurations results in electronic devices that achieve less power savings than would otherwise be achievable if optimum low-power modes could be defined and implemented for particular operating conditions.

In addition to the operational limitations of current programming of low-power modes, the effort of defining in advance a set of low-power modes and hard coding the modes into a processor involves significant developer effort. Since the definition of the low-power modes is code-driven, and not data-driven, small changes made to device configurations and small changes made to the set of resource low-power modes requires extensive retesting to confirm that the code changes do not cause device errors. Thus, current methods for implementing low-power modes are unable to keep pace with changes in device configurations (e.g., components, software, etc.) that may occur during the production run of a product.

To address these concerns, the various aspects provide methods that enable the sleep problem to be simplified for device processors so that more optimum low power mode selections may made by processors in real time. In the aspects, a compilable domain-specific language (e.g. low power mode domain specific language or LPMDSL) is used to define resources and their low power resource modes that associates the resource with its low power resource modes and the latency, power saving, interdependency, entry and exit requirements, and others characteristics of each mode. Low power resource modes definitions using this domain-specific language may then be compiled in a manner that takes into account the various selection and operational factors relating to processor status, operational characteristic, latency, overall power savings, as well as the static and dynamic dependencies of the low power modes and devices. The result of this compilation may be the generation of a smaller set of virtual low power resource modes and mode-selection criteria that a processor can use to select an optimum or near-optimum low power mode configuration in real time or near-real time.

The various aspects enable component developers to define various low power modes for each of their components that take various factors into consideration, such as the type of resources in use, the worst-case latency that can be tolerated, dynamic operating conditions (e.g., temperature), expected idle time, and component latency. The low power resource modes defined for each resource may also define static and dynamic dependencies. Device processors may then select various low power resource modes dynamically, at runtime. In an aspect, devices may compute and select a combination of low power modes that maximizes power savings and/or operation speed. In an aspect, a compiler may combine the low power modes of multiple resources to generate a smaller set of synthetic low power resources modes that that can be more efficiently used by the system to determine optimal power savings. These synthetic low power resource modes may reduce the complexity of the sleep problem decisions that need to be made at idle time by reducing the number of independent items that the processor must manage.

By generating synthetic low power resources, various aspects further improve system performance by combining the latency requirements and dependencies of various resources, reducing complexity of the runtime tasks. Synthetic low power resources also reduce the complexity associated with identifying and processing the dynamic dependencies of the low power resource modes, thus improving overall efficiency.

The various aspects use domain-specific language to more efficiently solve the "knapsack" problem, which is a well known optimization problem in computing. In various aspects, the compiler and domain-specific language may be used to implement a variety of known algorithmic or heuristic solutions to the knapsack problem. In an aspect, the compiler may use if/then/else logic tree algorithms, table lookup algorithms, and/or comparison methods to systematically work through the alternative permutations and combinations of the various low power modes to select an optimum set of low power modes. In an aspect, the compiler may use an optimum set of low power modes to generate a smaller set of synthetic low power resources that each define one or more synthetic low power resource modes that better and more efficiently characterize the power-savings available to the system than the original low power modes. These synthetic low power resource modes may also more efficiently express the resource interdependencies. In an aspect, the process of determining which resources may or may not be shut down may be moved out of the sleep path and onto the compiler path or resource use path.

In various aspects, the syntax for implementing the domain-specific language (e.g., LPMDSL) may include tokens and operators conforming to C-syntax rules. This syntax may be used to describe both static and dynamic dependencies. That is, both classes of dependencies may be described with the same syntax, since dependencies contain the same logical content. In various aspects, the meaning of the tokens may vary between static and dynamic dependencies. In various aspects, a string may be provided for each class of dependency. In various aspects, operators may be used that conform to C-syntax rules (e.g., parentheses for grouping of statements, && for AND, || for OR, ! for not, etc.).

In various aspects, the operators conforming to C-syntax rules (e.g., &&, ||, !) may be used in conjunction with name tokens to represent the dependencies and/or dependent resources. In various aspects, the name tokens may follow a URL-pathing metaphor (e.g., lpr://a/1), or a dot-convention metaphor (e.g., a.1). In an aspect, any ambiguity may be interpreted as meaning "at least one of," whereas the '*' character may be treated as a special character that means "all of." In various aspects, "lpr://" may represent static dependencies.

For example, in an aspect, various static dependencies may be represented by the name of the mode or resource prefixed by a '+' sign, as in "+a" "+b.1" or "+c.1&& +c.2". Static exclusions, or conditions which forbid a low power resource mode from being entered, may be represented similarly, except with a '−' sign prefix, as in "−a" "−b.1" or "−c.1||−c.2". In various aspects, every mode may have an implicitly defined static dependency upon itself. In various aspects, low power resources may define dynamic dependencies in the same string. In various aspects, dynamic entered dependencies may represented by the name of the mode or resource with no prefix, as in "a" "b.1" or "c.1 and c.2". Dynamic exclusions (or "not-entered" dependencies) may be represented with a '!' prefix, as in "!a" "!b.1" or "!c.1 and !c.2". For example, a first low power resource (LPR-A) may have a low power mode (LPM-off) having static dependencies defined by "+b."

Another low power resource (LPR-B) may have two low power modes (LPM-1b and LPM-2b), each of which may define their own static dependencies. For example, LPM-1b may leave its dependency as an empty string, relying only on the implicit static self-dependency, whereas LPM-2b may define its static dependencies as +b.1. In an aspect, low power resources may have multiple low power modes that define both dynamic and static dependencies. For example, a third low power resource (LPR-C) may have two low power modes (LPM-1c and LPM-2c) wherein LPM-1c has a static dependency defined as "(+a||+b)," and LPM-2c has a dynamic dependency represented as "+a && b.2".

As discussed above, in various aspects, operators may conform to C-syntax rules. Thus, applying this to the examples above, LPM-off would be allowed to be entered whenever one of LPR b's modes (either b.1 or b.2) is enabled. Likewise, LPM-1b would be able to be entered whenever it was enabled, as it has only an implicit self-dependency; LPM-2b would be able to entered when both it and b.1 are enabled; and LPM-1c would be able to be entered whenever one a mode of either a.off, b.1, or b.2 are enabled. Since LPM-2c has both static and dynamic dependencies, LPM-2c could be entered only when it is enabled, a.off is enabled, and LPM-2b of LPR-B has been entered. The static and dynamic dependencies of low power modes are discussed in more detail below.

In various aspects, the domain-specific language may factor in latency requirements of multiple components by allowing the definitions of multiple named "latency components," each of which may interact with other latency components of the same name. In various aspects, this interaction may be described in terms of an operation and a value. The operation may be additive (e.g., setting a new minimum latency for that component) or multiplicative (e.g., an expansion and/or contraction of the existing latency). Enabling multiple named latency components to interact with each other allows for more efficient handling of dynamic dependencies. In implementations in which multiple low power modes overlap, defining and managing latencies in this manner provides a flexible mechanism for specifying latency, without needlessly depleting the latency budget by "double-counting" the latencies of multiple interdependent components. This is especially useful when generating synthetic low power resource modes that encompass the low power modes of multiple resources.

In the various aspects, when the processor is able to enter an idle state, a low-power task may run a "solver" process to determine which low-power modes for the various resources should be entered. An example of this is illustrated in FIG. 1 which illustrates how a process (i.e., node) within a Node Power Architecture (NPA) 2 determines for a resource, such as a crystal oscillator 4, which of two available low power modes 6, 8 can be entered. In the example illustrated in FIG. 1, the crystal oscillator resource 4 has two alternative low-power modes, namely a gated operating state 6 and complete shutdown 8.

Selecting an optimum set of low-power modes for each of the various resources eligible for being placed into a low-power mode involves selecting one of the available modes for each resource that is able to be placed into a low power mode. Each of the selected low-power modes may be entered by calling an "enter" function of the low power mode. Once the enter function of the low power mode is called, the resource may be placed in a power savings state defined by its selected low power resource mode. While the processor is idle, the processor may perform a wait for interrupt (WFI) process and/or idle process. The processor and selected resources may remain in this state until a wakeup event occurs. When a wake-up event occurs, for each selected resource, an associated "exit" function may be called to return the resource to the desired operating state (e.g., a normal or full power state).

Figure 2:
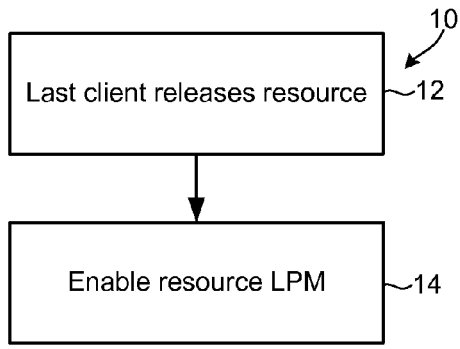
FIG. 2 is a process flow diagram of a method by which a shared resource enables the ability to enter a low power mode according to an aspect.
Figure 3:
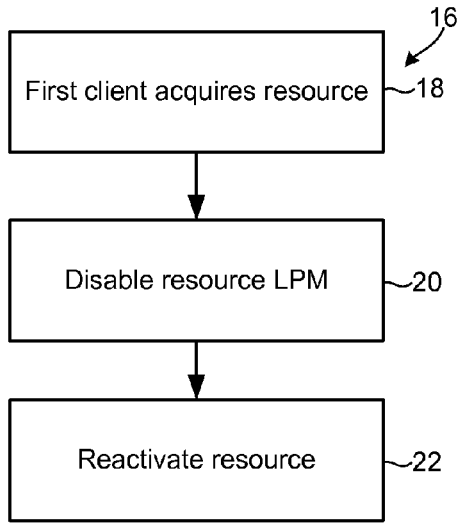
FIG. 3 is a process flow diagram of a method by which a shared resource disables the ability to enter a low power mode according to an aspect.
Figure 4:
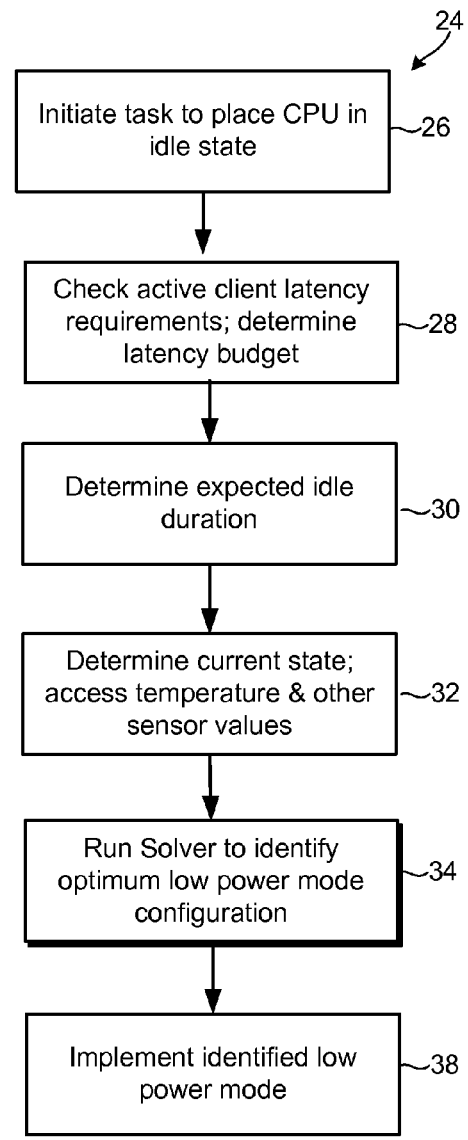
FIG. 4 is a process flow diagram of a method for selecting and entering a low power mode according to an aspect.

Processes for implementing the various aspects are illustrated in FIGS. 2-4. Referring to FIG. 2, in aspect method 10, when a resource is no longer in use because a client has released the resource at block 12, a resource low-power mode flag may be enabled at block 14, such as by implementing an operation as illustrated in the examples listed above. At this point, the resource has indicated that it is available to be placed in a low-power mode. However, the fact that a resource is available to be place in a low-power mode (e.g., it is not currently being used) does not mean that it should be, because as discussed above, that decision will depend upon the resource's low-power mode exit latency and power savings, as well as the resource interdependencies.

Method 16 illustrated in FIG. 3 may be implemented when a wake-up event occurs and a client requests access to a resource then in a low-power mode. In an aspect, when a client requests a resource at block 18, the low-power mode flag for the resource may be disabled at block 20. At block 22, the resource may then be reactivated such as by accomplishing an associated "exit" function as mentioned above.

FIG. 4 illustrates an aspect method 24 by which a processor may identify an optimum set of low-power modes to implement in a particular idle state. When an idle and/or sleep task is initiated to place a processor in a low power state at block 26, the processor may identify those resources that can be placed in a low-power mode by checking the low power resource for resource low-power mode flags, or via the syntax and operations described above. At block 28, the processor may check the latency requirements of active clients, such as by accessing a data structure defined for the client, and use that information to determine a latency budget. The latency budget defines the total latency that the system can accommodate during an idle cycle. In an aspect, the latency budget may be defined as the minimum of all the latencies acceptable to all the concurrent processors and clients.

Returning to FIG. 4, at block 30, the processor may determine the expected idle time (e.g., the duration the processor is expected to remain in the idle state before a wake-up event given the current conditions). In an aspect, when a timer event is known to the idle task ahead of time, the idle task may schedule the wakeup processing to occur before the timer event such that it does not add latency to the wakeup process (e.g., hard wakeup or scheduled wakeup). In another aspect, when an event that is expected to occur, but it is not known precisely when or if it will indeed occur (i.e., when the wakeup processing cannot be deterministically done in advance), the wakeup time can be used to disallow modes that might otherwise be entered (e.g., due to a long time until the next scheduled wakeup). Using the expected wakeup time in the manner described above is referred to herein as a soft wakeup or a hinted wakeup.

Returning to FIG. 4, at block 32, the processor may determine current state conditions, such as by accessing a data register storing the current temperature and other sensor values. Using the current state and resource low-power mode data gathered in blocks 28-32, the processor may execute a "solver" function to identify an optimum low-power mode configuration in block 34. As part of one or more of blocks 28-32, the processor may calculate potential power savings that may be expected for each low power mode, such as by calculating the potential power savings per unit time at a current temperature (and other operating condition) times the expected idle time, and use this value as part of the solver process in block 34. In various aspects, instead of the linear power savings calculation described above, the processor may calculate potential power savings on an arbitrary model, or using another non-linear power calculation model, and use this value as part of the solver process in block 34. This solver operation in block 34 may include evaluation of the synthesized low power resource modes generated by compiling the resource definitions as discussed above. In an aspect, the solver solutions may be cached to at or near the idle time to generate solutions consistent with the devices' current operating state (e.g., temperature, active services, etc.) Performing the solve function in block 34 may identify an optimum low power mode configuration in block 38.

Once an optimum low-power mode configuration is identified, the processor may enter that mode in block 38, such as by causing each selected resource low-power mode to execute an associated enter function. The system will remain in this idle state and low power mode until a wakeup event, such as a timer interrupt. When a wake up event or interrupt occurs, the processor and associated resource will exit the idle state, such as by executing a series of exit functions for each of the resources in low power modes which returns those resources to their normal operating state.

Figure 5:
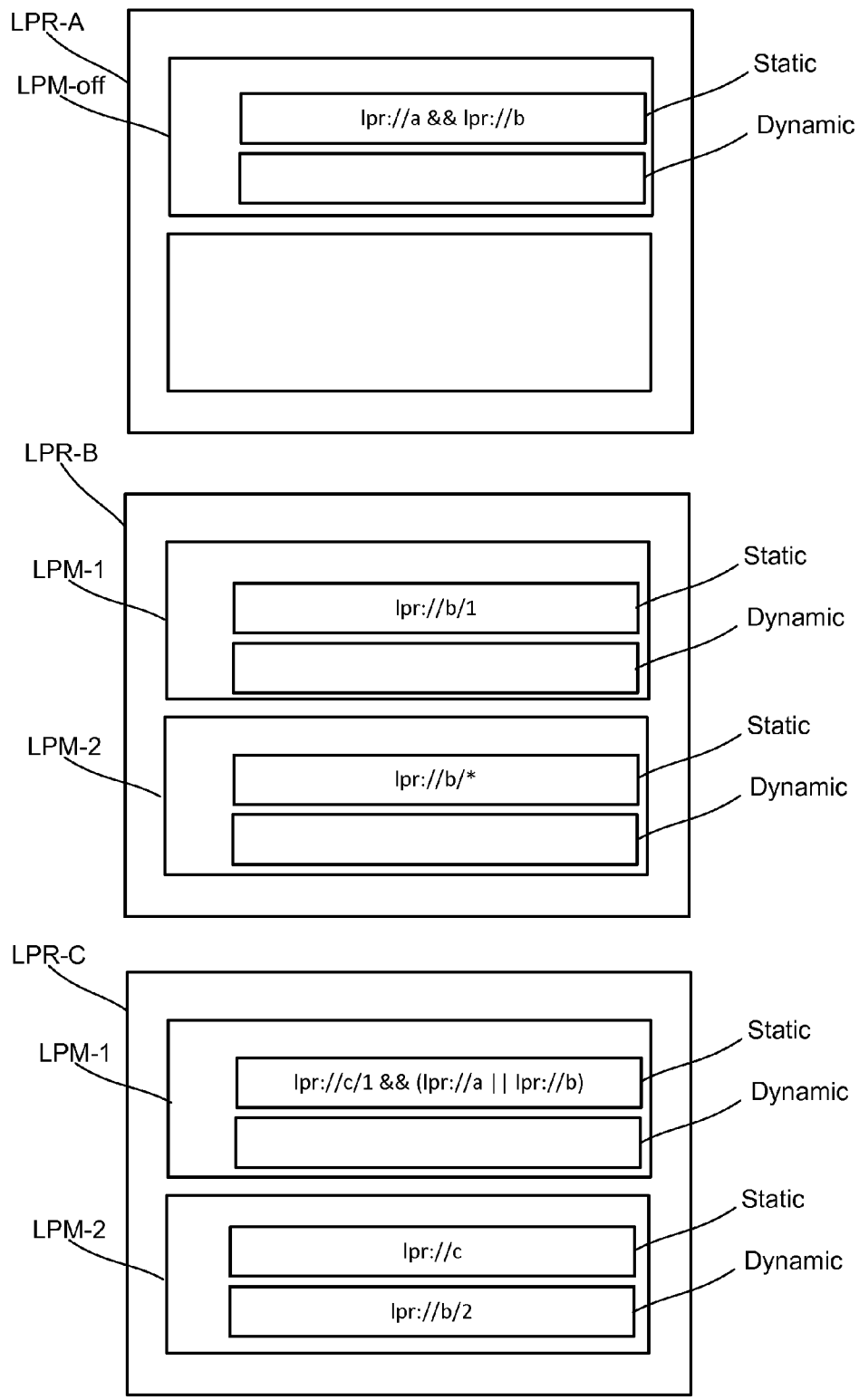
FIG. 5 is a programming node and resource diagram illustrating an aspect method for selecting and entering a low power mode.

FIG. 5 diagrammatically illustrates low power resources that define one or more low power modes. Specifically, FIG. 3 illustrates three resources (LPR-A, LPR-B, LPR-C), each having one or more low power modes (LPMs). In this illustration, static dependencies are represented by "lpr://a," "lpr://b/1," "lpr://b/2," "lpr://c/1," and "lpr://c/2." As discussed above, each low power resource may define its own static dependencies by using a combination of operators. For example, FIG. 5 shows that low power resource LPR-A has a low power mode "LPM-off" that defines its static dependency as "lpr://a && lpr://b."

FIG. 5 also illustrates low power resources may have more than one low power mode and that each low power mode may define its own dependencies independent of the other modes within that resource. For example, low power resource LPR-B has two low power modes LPM-1, LPM-2 that independently define their own static dependencies as null. FIG. 5 further illustrates that low power modes may define any combination of static and dynamic dependencies. For example, the third low power resource LPR-C has two low power modes, LPM-1, LPM-2. LPM-1 of LPR-C has only a static dependency, defined as "(lpr://a∥lpr://b)," whereas LPM-2 of LPR-C has both a static and dynamic dependency, the static dependency being defined as "lpr://c," and the dynamic dependency being defined as "lpr://b/2."

As discussed above, in the configuration illustrated in FIG. 5, LPM-off has a static dependency of "lpr://a && lpr://b." Thus, the low power mode LPM-off can only be entered when flags lpr://a and one of either lpr://b/1 or lpr://b/2 are set. Likewise, since LPM-1 of LPR-B defines lpr://b/1 as its static dependency, it can only be entered when the lpr://b/1 flag is set. LPM-2 of LPR-B defines lpr://b/* as static dependencies, and thus, can only be entered when flags lpr://b/1 and lpr://b/2 are both set. LPM-1 of LPR-C defines its static dependencies as lpr://c/1 && (lpr://a∥lpr://b), and can be entered whenever flags lpr://c/1 and one of either lpr://a, lpr://b/1, or lpr://b/2 is set. LPM-2 of LPR-C has both static and dynamic dependencies. Therefore, LPM-2 of LPR-C can only be entered when LPM-2 of LPR-B has been entered and one of lpr://c/1 or lpr://c/2 flags has been set. While FIG. 5 illustrates a specific case of low power modes and their dependencies, the values and structure used therein are for illustrative purposes only. Nothing in this application should be viewed as limiting the invention to the specific illustrated values and structure, unless specifically recited by the claims.

Figure 6:
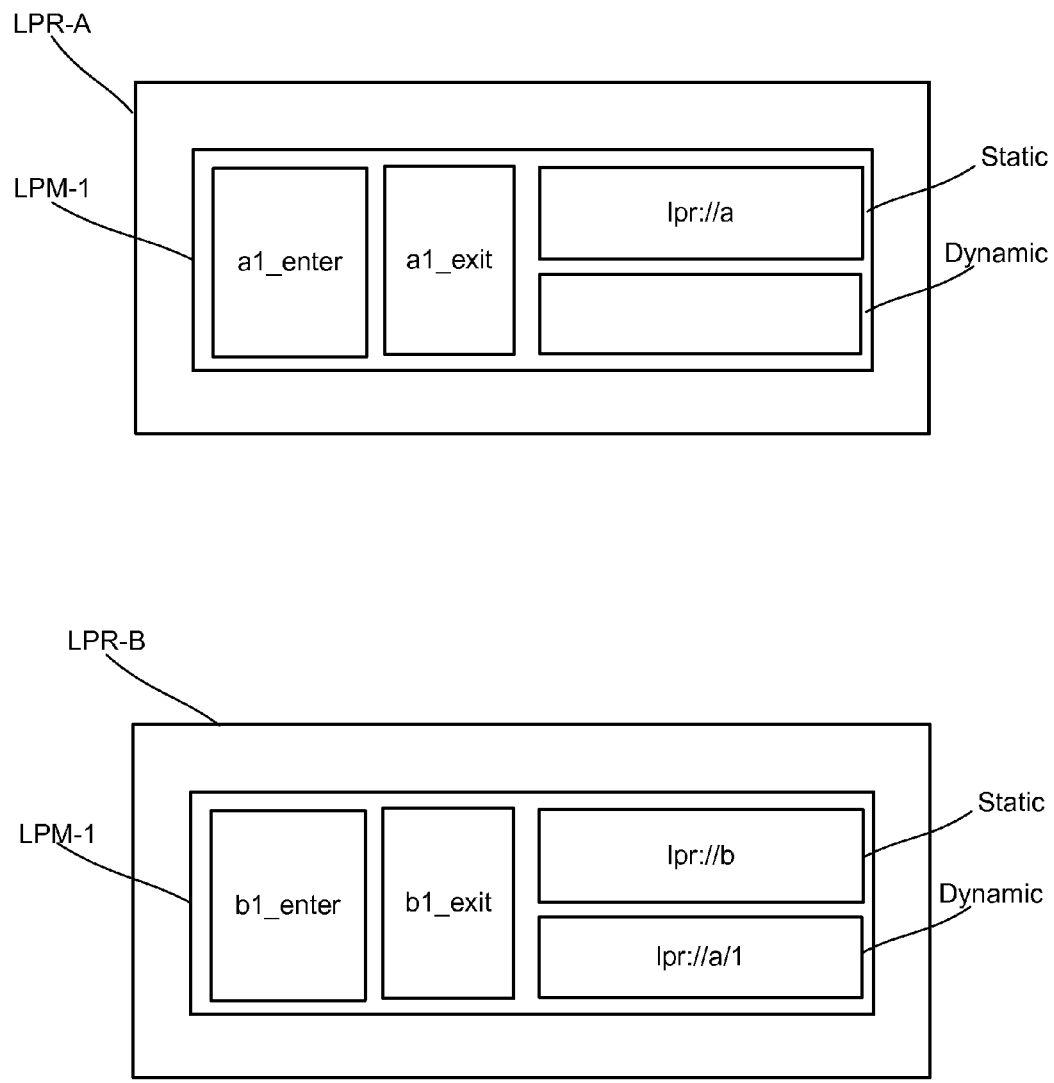
FIG. 6 is an illustration of two low power resource modes showing dependencies and functions.

FIG. 6 illustrates low power modes having functions in addition to dependencies. Specifically, FIG. 4 illustrates two low power resources LPR-A and LPR-B, each having an enter function (a1_enter, b1_enter) and an exit function (a1_exit, b1_exit). Additionally, FIG. 4 illustrates that LPR-A has a static dependency of "lpr://a," which means that LPR-A may only be entered when lpr://a is set in the logic tree of the corresponding low power resource mode. LPR-B has both static and dynamic dependencies, the static dependencies being "lpr://b" and the dynamic dependencies being "lpr://a/1." Due to these dependencies, LPR-B may only be entered when flag lpr://a is set and LPM-1 of LPR-A has been previously entered. Thus, in the system illustrated by FIG. 4, there are only 3 possible states: either no mode is performed; LPM-1 of LPR-A is performed; or LPM-1 of LPR-A and LPM-1 of LPR-B are performed. While there are only three possible modes, the subset of possible modes is described across two different (and independent) low power resources. Both efficiency and performance can be improved by combining the two independent low power resources into a single synthetic low power resource mode that can accurately reflect the subset of possible modes.

Figure 7:
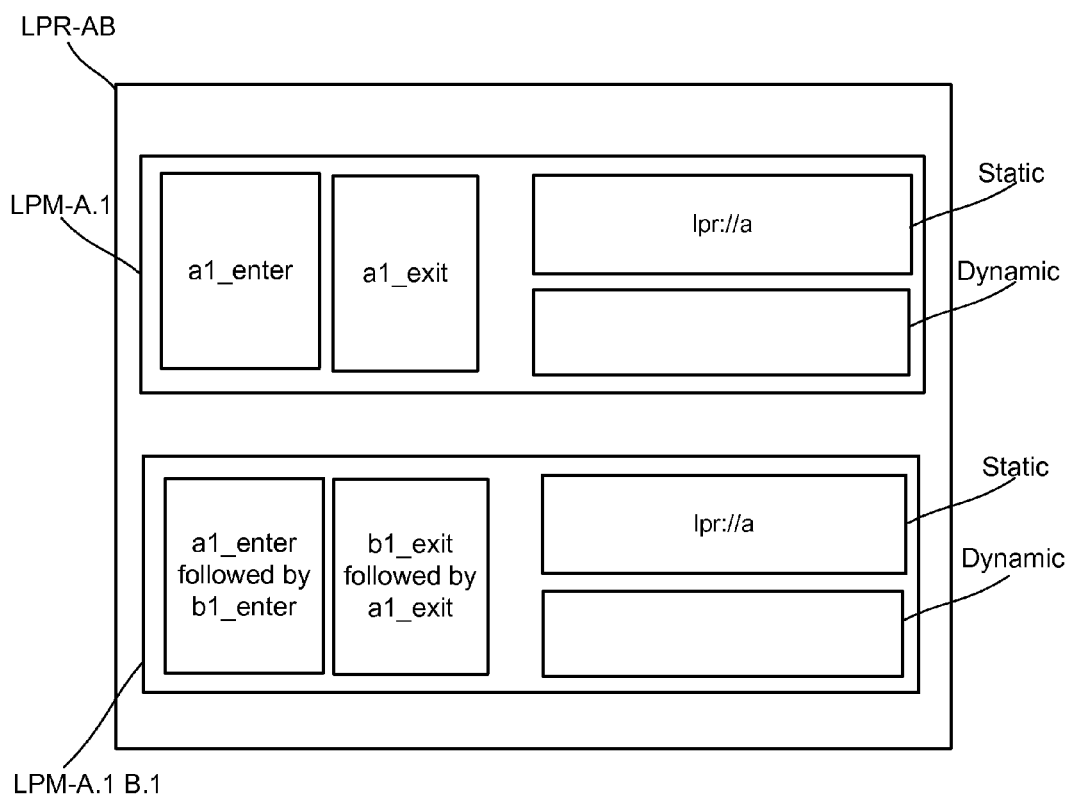
FIG. 7 is an illustration of a virtual low power resource mode resulting from compiling the two low power resource modes illustrated in FIG. 6 according to an aspect.

FIG. 7 illustrates a synthetic low power resource mode based on the combination of LPR-A and LPR-B illustrated in FIG. 6. Specifically, FIG. 7 illustrates that, in the various aspects, it is possible to use the domain specific compiler to detect dominance relationships within the set of registered modes and combine individual low power resources with related modes into a single new synthetic low power resource with a combined list of low power resource modes. In the various aspects, this is achieved by the domain specific compiler combining the various LPRs into a single synthetic low power resource at registration time. As can be seen from FIG. 7, the combined synthetic low power resources may have fewer or simpler dynamic dependencies, and as a result, a significant reduction in the complexity of the sleep problem.

Synthetic low power resources may also reduce the complexity of the decisions that need to be made at idle time by reducing the number of independent items that a solver process needs to operate over. Also, when these combination operations are performed by the compiler repeatedly, for as long as new combinations can be made, it is possible to collapse large trees of dynamically dependent resources down into a much smaller subset of synthetic resources that represent all the independent states that can be entered. Since the generalized problem the solver needs to solve is the knapsack problem (an NP-complete problem known in the computational sciences), reductions in the size of 'n' greatly reduce the running time of the solver.

FIG. 7 also illustrates that the synthetic LPR-AB has one or more modes containing a list of enter and exit functions, rather than a single enter/exit function pair. As resources are collapsed into their combined forms, the modes that they describe (which were originally implemented independently) are now implemented together. However, the implementations of each the enter functions and the exit functions may remain in their original, independent, forms. This enables the modes to be recombined later as more modes are defined and new synthesized modes created, as well as reduce the direct coupling between modes.

Figure 8:
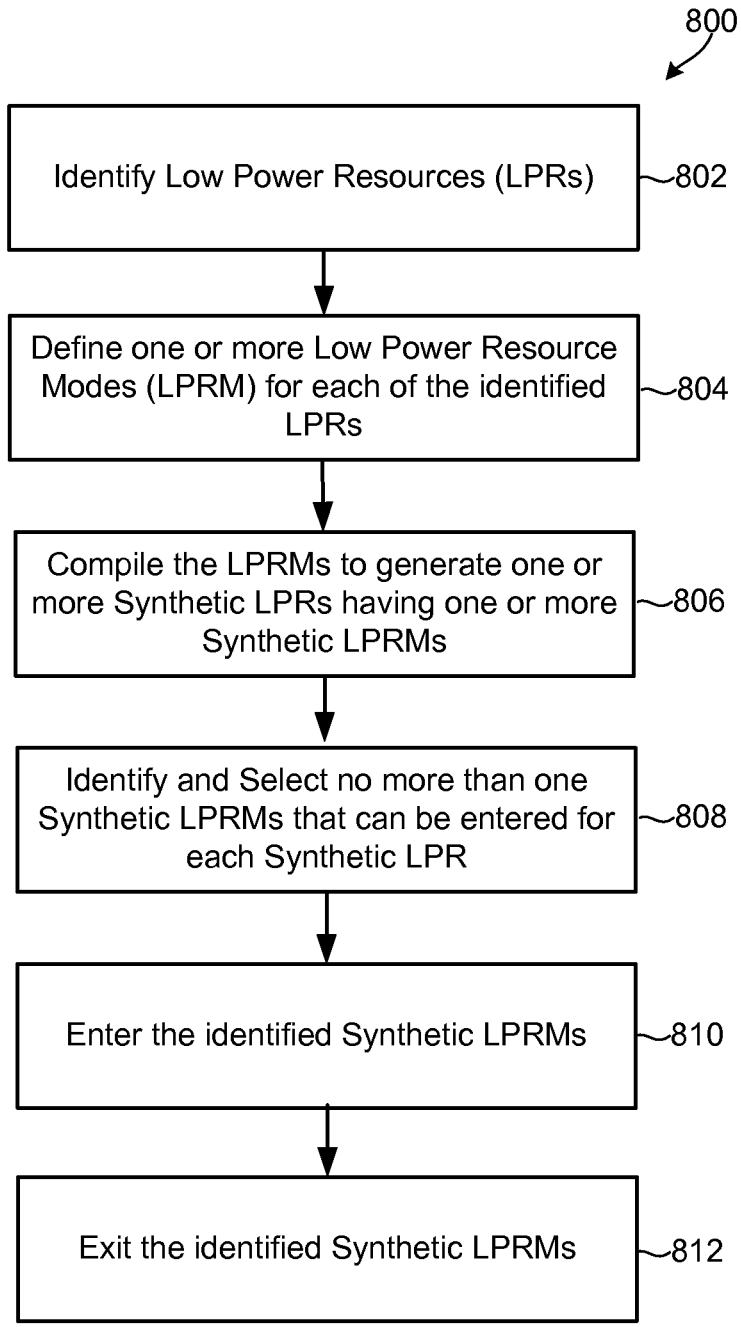
FIG. 8 is a process flow diagram of a method for selecting and entering a low power mode according to an aspect.

FIG. 8 illustrates an aspect method 800 for generating synthetic low power resources modes that the solver may use to identify an optimum low power mode configuration. At block 802, a component or device developer may identify resources that are capable of being disabled and/or placed in an idle mode when the processor is not actively processing. At block 804, the component or device developer may define, in a domain specific language and/or compliable expression, the low power resource modes of the identified low power resources. The low power resource modes may each identify a set of resource dependencies, power savings and latency times associated with a resource, as well as a low power state into which the resource can be placed when it is no longer being utilized. At block 806, a compiler may compile the low power resource modes to generate one or more synthetic low power resources having more or more synthetic low power resource modes. The low power resource modes may represent the functionality, power savings, latency and resource dependencies of one or more of the low power resource modes. At block 808, the processor may select an optimal set of synthetic low power resource modes by identifying no more than one synthetic low power resource mode that can be entered for each of the generated synthetic low power resources. In an aspect, synthetic low power resource modes may be selected based on the processor's power savings, latency time, and dependency requirements. At block 810, the processor may place the resources in low power modes by calling the enter functions of the identified synthetic low power resource modes. At block 812, the processor may exit the low power modes by calling the exit functions of the identified synthetic low power resource modes.

As large and complex trees are broken down into a much smaller subset of truly independent synthetic resources, the lists of enter and exit functions can become excessively long. Thus, in various aspects, it is possible to apply just-in-time compilation techniques to the lists of functions to dynamically rewrite the code that implements the combined low power mode into a single function. This effectively optimizes the combined low power mode, eliminates overhead and helps reduce the latency associated with entering and exiting the sleep state. For example, in an aspect, two or more resources' latency and power functions may be combined by the domain specific compiler to create a single synthetic low power mode that accurately reflects each resource's latency and power requirements. These synthesized latency and power functions allow for a reduction in the amount of function calling and data manipulation required when the processor enters an idle state. These synthesized functions also allow the determination stage to be hosted out of the sleep time processes and into a compiler or a Just-In-Time compiler. Additionally, power and latency functions are defined in a manner that allows them to be combined arithmetically without requiring full JIT capability. Thus, a lot of the processing can be removed from the run time path and moved into the definition time space.

As discussed above, synthesized functions also reduce the order of discrete things that must be checked considerably. As such, in solving the NP-Hard (e.g., knapsack) problem, a much smaller order N is required, and over a much more mutually exclusive set. Thus, not only does N get smaller but it gets better conditioned. This makes finding optimal or near-optimal solutions possible, shortens the processing times, and lessens the computation necessary for optimization.

In various aspects, all of the synthetic low power resource modes within a low power resource may be mutually exclusive. In various aspects, if all of the synthetic low power resource modes within a low power resource are mutually exclusive, the processor can stop evaluating all the other low power resource modes as soon as the system determines that one low power resource mode matches the requirements, thereby improving efficiency. Having mutually exclusive virtual low power resource modes also makes the selection of a low power resource mode a simpler problem, because the system can simply pick a single low power resource mode that saves the most power, or has other characteristics desired by the system. In these aspects, not only does N get smaller, but N gets better behaved in terms of the problem to be solved. That is, combining these functions increases the amount of mutually exclusive categories the system needs to consider, thereby reducing complexity. In various other aspects, the processor may continue evaluating other low power resource even after the system determines that a low power resource mode matches the requirements, and despite making a determination that all of the synthetic low power resource modes within a low power resource are mutually exclusive. In these aspects, the system makes a determination that stopping at the first low power resource mode that satisfies the constraints will not be optimal. The system may make this determination based on the presence and/or absence of additional constraints.

In various aspects, the compiler can be portable, so as to be reusable across multiple processor architectures. Some aspects of JIT compiler are necessarily processor specific, although there are mechanisms that can be used to reduce the degree of processor specific code that is necessary. For example, the power and latency functions can be defined as mathematical expressions, and be JIT'd by adding the mathematical expressions together such that there is no processor specific code necessary for this particular operation of the JIT compiler.

In various aspects, in addition to the function and dependencies, the synthetic low power modes may define ordering mechanisms that identify the order of operations. This can be critical to synthesizing modes which have functional dependencies that must be satisfied in a particular order. In addition, even when there are not functional requirements that necessitate a particular ordering, it is possible that some orderings are more efficient in power and/or performance than other orderings. By allowing LPRMs to specify via the LPMDSL which other LPRMs they must precede or succeed, the LPRMs can ensure the appropriate functional or operational ordering. The synthesized LPRMs will then be executed in this order.

In various aspects, in addition to defining power savings and latency information, a low power mode may define an associated backoff time. The backoff time indicates the amount of time that must be allowed for the low power mode to exit, before the next scheduled wakeup event occurs. The backoff time may be subtracted off of the scheduled deadline, in order to calculate a wakeup point that allows the system to exit the low power mode before the deadline expires. This may be critical to meeting functional deadlines in the system. The backoff time is less than or equal to the exit latency. Where the exit latency may represent overhead from multiple processors for exiting the low power mode, the backoff time represents only the overhead from the local processor for exiting the mode.

In various aspects, the process of defining power savings, latency information, and associated backoff time may be performed off-target, during the software build process. In various aspect, this provides the system with most of same benefits described above, but with lower memory consumption.

Figure 9:
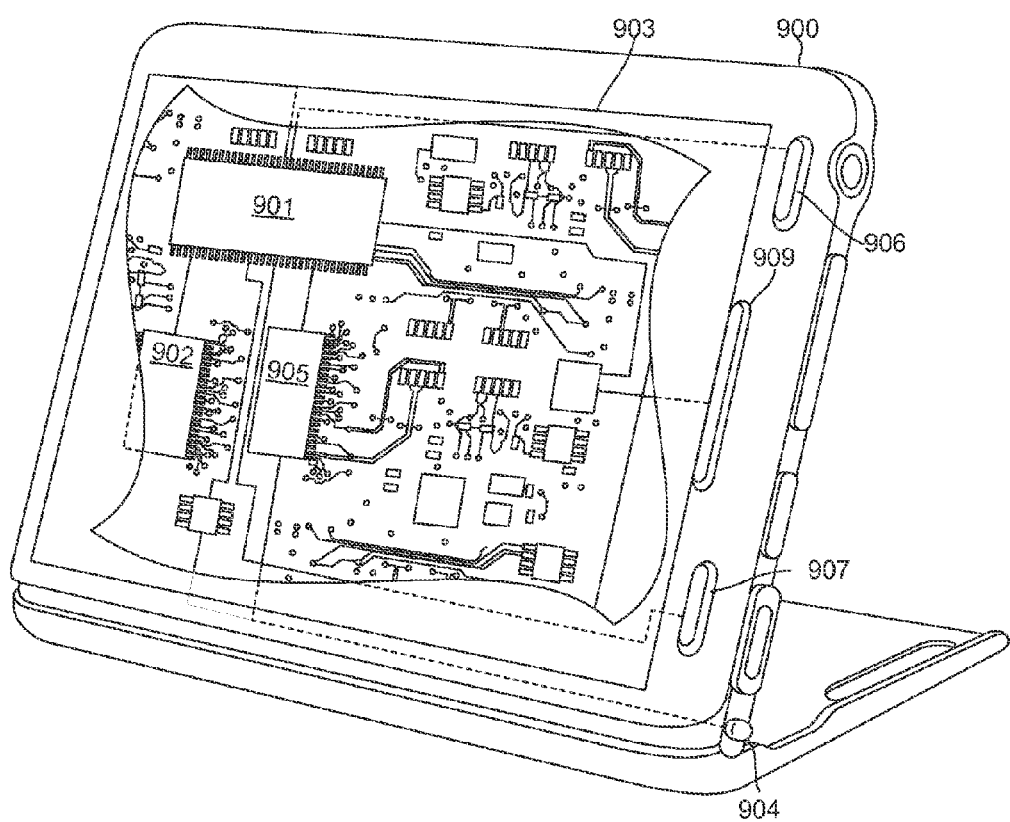
FIG. 9 is a cutaway perspective view of a mobile computing device suitable for use with the various aspects.

Typical mobile devices 900 suitable for use with the various embodiments will have in common the components illustrated in FIG. 9. For example, an exemplary mobile receiver device 900 may include a processor 901 coupled to internal memory 902, a display 903, and to a speaker 909. Additionally, the mobile device 900 may have an antenna 904 for sending and receiving electromagnetic radiation that is connected to a mobile multimedia receiver 905 coupled to the processor 901. In some embodiments, the mobile multimedia receiver 905 may include an internal processor, such as a digital signal processor (DSP) for controlling operations of the receiver 905 and communicating with the device processor 901. Mobile devices typically also include a key pad or miniature keyboard and menu selection buttons or rocker switches 906 and 907 for receiving user inputs.

The processor 901 may be any programmable microprocessor, microcomputer or multiple processor chip or chips that can be configured by software instructions (applications) to perform a variety of functions, including the functions of the various embodiments described herein. Also, the functions of the various embodiments may be implemented in a DSP processor 908 within the receiver 905 configured with DSP-executable instructions. Typically, software applications and processor-executable instructions may be stored in the internal memory 902 before they are accessed and loaded into the processor 901. In some mobile devices, the processor 901 may include internal memory sufficient to store the application software instructions. In some mobile devices, the secure memory may be in a separate memory chip coupled to the processor 901. In many mobile devices 900, the internal memory 902 may be a volatile or nonvolatile memory, such as flash memory, or a mixture of both. For the purposes of this description, a general reference to memory refers to all memory accessible by the processor 901, including internal memory 902, removable memory plugged into the mobile device, and memory within the processor 901 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for conserving power in a computing device having a plurality of resources and at least one processor, comprising:
    defining a plurality of low power resource modes in a compilable expression, each of the plurality of low power resource modes identifying a set of resource dependencies, power savings and latency time characteristics associated with a resource as well as a low power state into which each of the plurality of resources can be placed when not in use;
    selecting at runtime a combination of low power resource modes maximizing power savings and latency savings;
    compiling the defined plurality of low power resource modes to generate one or more synthetic low power resources each having one or more synthetic low power resource modes that represent functionality, power savings, latency time and resource dependencies characteristics of the selected combination of low power resource modes;
    controlling at least one synthetic low power resource and selecting, at an idle time, at most one synthetic low power resource mode for each synthetic low power resource based on the synthetic low power resource mode's power savings, latency time, and resource dependency requirements based on current operating conditions of the computing device; and
    entering and exiting the selected synthetic low power resource modes in the appropriate order when the processor becomes and leaves idle.

2. The method of claim 1, wherein at most one synthetic low power resource mode for each synthetic low power resource are selected considering operating temperature.

3. The method of claim 1, wherein all of the synthetic low power resource modes within a synthetic low power resource are generated to be mutually exclusive.

4. The method of claim 1, wherein each synthetic low power resource mode defines an ordering mechanism that identifies an order of operations in which the processor must select, enter and exit the synthetic low power resource mode.

5. The method of claim 1, wherein the synthetic low power resources are generated by a domain specific compiler that respects dependency relationships between the low power resource modes.

6. The method of claim 1, further comprising evaluating the low power resource modes of each resource to select one low power resource mode for each resource that may be placed in a low power state based upon the resource dependencies, power savings, expected idle time and latency time characteristics.

7. The method of claim 1, wherein each of the plurality of low power resource modes have an enter function and an exit function.

8. The method of claim 7, wherein each synthetic low power resource mode has an enter function having the same functionality as enter functions of two or more low power resource modes.

9. The method of claim 7, wherein each synthetic low power resource mode has an exit function having the same functionality as exit functions of two or more low power resource modes.

10. The method of claim 1, further comprising determining a latency budget based upon latency requirements identified by processors and clients.

11. The method of claim 10, wherein the low power resource modes are selected based on their having a latency requirement that is less than the latency budget.

12. A computing device having a plurality of resources and at least one processor, comprising:
    means for defining a plurality of low power resource modes in a compilable expression, the low power resource modes identifying a set of resource dependencies, power savings and latency time characteristics associated with a resource as well as a low power state into which each of the plurality of resources can be placed when not in use;
    means for selecting at runtime a combination of low power resource modes maximizing power savings and latency savings;

means for compiling the defined plurality of low power resource modes to generate one or more synthetic low power resources each having one or more synthetic low power resource modes that represent functionality, power savings, latency time and resource dependencies characteristics the selected combination of low power resource modes;

means for controlling at least one synthetic low power resource and means for selecting, at an idle time, at most one synthetic low power resource mode for each synthetic low power resource based on the synthetic low power resource mode's power savings, latency time, and resource dependency requirements based on current operating conditions of the computing device; and means for entering and exiting the selected synthetic low power resource modes in the appropriate order when the processor becomes and leaves idle.

13. The computing device of claim 12, wherein means for selecting at most one synthetic low power resource mode for each synthetic low power resource comprises means for selecting at most one synthetic low power resource mode for each synthetic low power resource considering operating temperature.

14. The computing device of claim 12, wherein means for compiling the defined plurality of low power resource modes to generate one or more synthetic low power resources comprises means for compiling the defined plurality of low power resource modes to generate one or more synthetic low power resources so that all of the synthetic low power resource modes within a synthetic low power resource are mutually exclusive.

15. The computing device of claim 12, wherein means for compiling the defined plurality of low power resource modes to generate one or more synthetic low power resources comprises means for compiling the defined plurality of low power resource modes to generate one or more synthetic low power resources so that each synthetic low power resource mode defines an ordering mechanism that identifies an order of operations in which the processor must select, enter and exit the synthetic low power resource mode.

16. The computing device of claim 12, wherein means for compiling the defined plurality of low power resource modes to generate one or more synthetic low power resources comprises means for compiling the defined plurality of low power resource modes to generate one or more synthetic low power resources using a domain specific compiler that respects dependency relationships between the low power resource modes.

17. The computing device of claim 12, further comprising: means for evaluating the low power resource modes of each resource to select one low power resource mode for each resource that may be placed in a low power state based upon the resource dependencies, power savings, expected idle time and latency time characteristics.

18. The computing device of claim 12, wherein each of the plurality of low power resource modes have an enter function and an exit function.

19. The computing device of claim 18, wherein means for compiling the defined plurality of low power resource modes to generate one or more synthetic low power resources comprises means for compiling the defined plurality of low power resource modes to generate one or more synthetic low power resources so that each synthetic low power resource mode has an enter function having the same functionality as enter functions of two or more low power resource modes.

20. The computing device of claim 18, wherein means for compiling the defined plurality of low power resource modes to generate one or more synthetic low power resources comprises means for compiling the defined plurality of low power resource modes to generate one or more synthetic low power resources so that each synthetic low power resource mode has an exit function having the same functionality as exit functions of two or more low power resource modes.

21. The computing device of claim 12, further comprising: means for determining a latency budget based upon latency requirements identified by processors and clients.

22. The computing device of claim 21, wherein means for selecting at most one synthetic low power resource mode for each synthetic low power resource comprises means for selecting at most one synthetic low power resource mode for each synthetic low power resource selecting the low power resource modes based on their having a latency requirement that is less than the latency budget.

23. An apparatus for conserving power in a computing device having a plurality of resources, the apparatus comprising:
a memory buffer;
and a processor coupled to the memory buffer, wherein the processor is configured with software instructions to perform operations comprising:
defining a plurality of low power resource modes in a compilable expression, the low power resource modes identifying a set of resource dependencies, power savings and latency time characteristics associated with a resource as well as a low power state into which each of the plurality of resources can be placed when not in use;
selecting at runtime a combination of low power resource modes maximizing power savings and latency savings;
compiling the defined plurality of low power resource modes to generate one or more synthetic low power resources each having one or more synthetic low power resource modes that represent functionality, power savings, latency time and resource dependencies characteristics of the selected combination of low power resource modes;
controlling at least one synthetic low power resource and selecting, at an idle time, at most one synthetic low power resource mode for each synthetic low power resource based on the synthetic low power resource mode's power savings, latency time, and resource dependency requirements based on current operating conditions of the apparatus; and
entering and exiting the selected synthetic low power resource modes in the appropriate order when the processor becomes and leaves idle.

24. The apparatus of claim 23, wherein the processor is further configured with software instructions such that the low power resource modes are selected considering operating temperature.

25. The apparatus of claim 23, wherein the processor is further configured with software instructions such that all of the synthetic low power resource modes within a synthetic low power resource are generated to be mutually exclusive.

26. The apparatus of claim 23, wherein the processor is further configured with software instructions such that each synthetic low power resource mode defines an ordering mechanism that identifies an order of operations in which the processor must select, enter and exit the synthetic low power resource mode.

27. The apparatus of claim 23, wherein the processor is further configured with software instructions such that the synthetic low power resources are generated by a domain specific compiler that respects dependency relationships between the low power resource modes.

28. The apparatus of claim 23, wherein the processor is configured with software instructions to perform operations further comprising:
  evaluating the low power resource modes of each resource to select one low power resource mode for each resource that may be placed in a low power state based upon the resource dependencies, power savings, expected idle time and latency time characteristics.

29. The apparatus of claim 23, wherein the processor is further configured with software instructions such that each of the plurality of low power resource modes have an enter function and an exit function.

30. The apparatus of claim 29, wherein the processor is further configured with software instructions such that each synthetic low power resource mode has an enter function having the same functionality as enter functions of two or more low power resource modes.

31. The apparatus of claim 29, wherein the processor is further configured with software instructions such that each synthetic low power resource mode has an exit function having the same functionality as exit functions of two or more low power resource modes.

32. The apparatus of claim 23, wherein the processor is configured with software instructions to perform operations further comprising:
  determining a latency budget based upon latency requirements identified by processors and clients.

33. The apparatus of claim 32, wherein the processor is further configured with software instructions such that the low power resource modes are selected based on their having a latency requirement that is less than the latency budget.

34. A non-transitory storage medium having stored thereon processor-executable software instructions configured to cause a processor to perform operations for conserving power in a computing device having a plurality of resources, the operations comprising:
  defining a plurality of low power resource modes in a compilable expression, the low power resource modes identifying a set of resource dependencies, power savings and latency time characteristics associated with a resource as well as a low power state into which each of the plurality of resources can be placed when not in use;
  selecting at runtime a combination of low power resource modes maximizing power savings and latency savings;
  compiling the defined plurality of low power resource modes to generate one or more synthetic low power resources each having one or more synthetic low power resource modes that represent functionality, power savings, latency time and resource dependencies characteristics of the selected combination of low power resource modes;
  controlling at least one synthetic low power resource and selecting, at an idle time, at most one synthetic low power resource mode for each synthetic low power resource based on the synthetic low power resource mode's power savings, latency time, and resource dependency requirements based on current operating conditions of the computing device; and
  entering and exiting the selected synthetic low power resource modes in the appropriate order when the processor becomes and leaves idle.

35. The non-transitory storage medium of claim 34, wherein the stored processor-executable software instructions are configured to cause a processor to perform operations such that the low power resource modes are selected considering operating temperature.

36. The non-transitory storage medium of claim 34, wherein the stored processor-executable software instructions are configured to cause a processor to perform operations such that all of the synthetic low power resource modes within a synthetic low power resource are generated to be mutually exclusive.

37. The non-transitory storage medium of claim 34, wherein the stored processor-executable software instructions are configured to cause a processor to perform operations such that each synthetic low power resource mode defines an ordering mechanism that identifies an order of operations in which the processor must select, enter and exit the synthetic low power resource mode.

38. The non-transitory storage medium of claim 34, wherein the stored processor-executable software instructions are configured to cause a processor to perform operations such that the synthetic low power resources are generated by a domain specific compiler that respects dependency relationships between the low power resource modes.

39. The non-transitory storage medium of claim 34, wherein the stored processor-executable software instructions are configured to cause a processor to perform operations further comprising:
  evaluating the low power resource modes of each resource to select one low power resource mode for each resource that may be placed in a low power state based upon the resource dependencies, power savings, expected idle time and latency time characteristics.

40. The non-transitory storage medium of claim 34, wherein the stored processor-executable software instructions are configured to cause a processor to perform operations such that each of the plurality of low power resource modes have an enter function and an exit function.

41. The non-transitory storage medium of claim 40, wherein the stored processor-executable software instructions are configured to cause a processor to perform operations such that each synthetic low power resource mode has an enter function having the same functionality as enter functions of two or more low power resource modes.

42. The non-transitory storage medium of claim 40, wherein the stored processor-executable software instructions are configured to cause a processor to perform operations such that each synthetic low power resource mode has an exit function having the same functionality as exit functions of two or more low power resource modes.

43. The non-transitory storage medium of claim 34, wherein the stored processor-executable software instructions are configured to cause a processor to perform operations further comprising:
  determining a latency budget based upon latency requirements identified by processors and clients.

44. The non-transitory storage medium of claim 43, wherein the stored processor-executable software instructions are configured to cause a processor to perform operations such that the low power resource modes are selected based on their having a latency requirement that is less than the latency budget.

* * * * *